US005740698A

United States Patent [19]

Myronuk et al.

[11] Patent Number: 5,740,698

[45] Date of Patent: Apr. 21, 1998

[54] FLAME ATTENUATOR FOR POKE-THROUGH CONSTRUCTIONS

[76] Inventors: Donald J. Myronuk, 1369 Bryan Ave., San Jose, Calif. 95118-1812; Jon F. Hoffman, 2445 Oro Dam Blvd., Ste 7, Oroville, Calif. 95966

[21] Appl. No.: 727,162

[22] Filed: Oct. 7, 1996

[51] Int. Cl.[6] ............................ B61F 15/22; F16H 59/04; B27N 9/00

[52] U.S. Cl. ............................ 74/473 R; 74/18.1; 74/566; 180/346; 277/212 FB; 277/237 A; 296/39.3; 428/58; 428/137; 428/921

[58] Field of Search .................................. 74/476 R, 566, 74/18.1; 277/212 FB, 237 A, DIG. 4; 296/39.3; 428/58, 137, 921; 180/346

[56] References Cited

U.S. PATENT DOCUMENTS

| | | | |
|---|---|---|---|
| 220,269 | 10/1879 | Boyd | 74/566 X |
| 1,037,631 | 9/1912 | Jones | 74/566 |
| 1,662,310 | 3/1928 | Geistert | 74/566 |
| 2,223,395 | 12/1940 | Van Buren | 296/39.3 |
| 5,580,648 | 12/1996 | Castle et al. | 428/921 X |

FOREIGN PATENT DOCUMENTS

| | | | |
|---|---|---|---|
| 55-159215 | 12/1980 | Japan | 74/566 |
| 55-159216 | 12/1980 | Japan | 74/566 |

*Primary Examiner*—Allan D. Herrmann
*Attorney, Agent, or Firm*—The Kline Law Firm

[57] ABSTRACT

A flame attenuator for poke-through constructions. The device is formed from a plurality of overlapping segments of metal screen firmly attached to a base frame and forming an inverted funnel-like structure with each of the segments converging loosely at the top of the inverted funnel. In application, the transmission shifter lever penetrates the smaller, upper hole thus formed, and in spite of being moved in horizontal arcs, maintains contact with the overlapping screen segments. Since there are a variety of boot geometries (circular based, oval based, and rectangular based) the flame attenuator base frame is provided in multiple shapes to accommodate the different boot configurations. The attenuator is located inside the shifter boot, and is manufactured either integrally to the boot, or as an add-on item. The flame attenuator protects the boot from rapid burn-through in the event of an engine fire.

6 Claims, 3 Drawing Sheets

FLAME ATTENUATOR FOR POKE-THROUGH CONSTRUCTIONS

FIELD OF THE INVENTION

The present invention relates generally to flame retarding devices, and more particularly is a flame retardant device adapted for poke-through constructions, particularly automobile gearshifts.

BACKGROUND OF THE INVENTION

There have been many devices disclosed in the prior art that aid in the retardation of fire. Most of the prior art devices are adapted to be placed in walls or floors of buildings, although some address other applications. The use of wire screen in such fire-retarding devices is well documented, going back at least to the "IMPROVEMENT IN CANS FOR HYDRO-CARBON LIQUIDS" of Ira Shaler, U.S. Pat. No. 119,657, issued Oct. 3, 1871.

Another example of a fire-retarding device using wire screen is the "WIRE SCREEN FIRE STOPS" of Joseph Charniga, U.S. Pat. No. 4,455,802, issued Jun. 26, 1984. This device comprises sheets of wire screen affixed to metal sheets that are positioned between the floor joists of a building. This device presumes the presence of regularly shaped voids in the area which is to be fire treated, so that the metal sheets can be received therein.

A device directed to providing a flexible fire barrier is the "FIRE RETARDANT BARRIER SYSTEM AND METHOD" of Knott, et al., U.S. Pat. No. 5,402,615, issued Apr. 4, 1995. This device is a fire resistant blanket comprising a layer of an inorganic material sandwiched between two metal fiber panels.

These devices provide no effective fire protection for poke-through constructions, where a planar surface must be penetrated. The area of penetration of a poke-through construction usually affords a path for fire to avoid the retardant measures. Accordingly, devices such as the "FIRE ISOLATION AN INSULATING APPARATUS" of Wise, et al., U.S. Pat. No. 3,678,634, issued Jul. 25, 1972, have been created. This device is directed to walls which have plastic pipes passing through them. The device utilizes what are essentially trap doors to be released to seal a hole receiving the pipe is the pipe is heated sufficiently so that it no longer supports the weight of the trap door. The trap door then seal the hole through which the pipe passes.

Another device is the "INTUMESCENT FIRE BARRIER MATERIAL LAMINATED WITH RESTRAINING LAYER" of Richard P. Licht, U.S. Pat. No. 4,467,577. This device is a multi-layered composite utilizing intumescent materials to retard flame propagation. This device is comprised of two restraining layers surrounding the intumescent material, thus forming a fire retarding sheet. The multiple layers of such devices make them somewhat bulky and difficult to fit tightly around curved objects.

This lead to a specific problem in vehicles. In many vehicles fires in the engine compartment are not uncommon. Vehicle drivers and occupants are protected in the vehicle interior from fires located in the engine spaces by a bulkhead/separator wall, also commonly referred to as a firewall, located from just below the windshield and extending to the floorboards, essentially including the floorboards for the entire passenger compartment. A fire expanding in the engine compartment and extending under the floorboards of a car is thus mechanically separated from the interior, which gives drivers and passengers sufficient time to safely evacuate the burning vehicle.

However, for vehicles with a floor-mounted transmission shifting apparatus, a hole exists in the floorboard/firewall, usually in the top of the transmission "hump". The hole allows the shift lever to be mechanically linked to the transmission. One or two thin, very flexible rubber "boots" cover the hole, which can be 4 to 5 inches in diameter. This allows shifter arm movement while keeping dust and moisture from getting into the vehicle interior. When the boot(s) are exposed to fire emanating from the engine compartment, they are rapidly breached, allowing flames and smoke to rapidly erupt and expand into the passenger compartment, presenting a very dangerous situation for occupants. Since the boot-covered shifter access hole is typically located at the top of the transmission hump in the floor area, the arrangement is a natural chimney that promotes rapid burn-through of the flexible boot and channels the fire upward to explode into the space occupied by the driver and passengers.

Accordingly, it is an object of the present invention to provide a simple, single layer device to effectively retard flame propagation in poke-through constructions.

It is a further object of the present invention to provide a device formed from readily available flexible metal sheets.

SUMMARY OF THE INVENTION

The present invention is a flame attenuator for poke-through constructions. The device is formed from a plurality of overlapping segments of metal screen firmly attached to a base frame and forming an inverted funnel-like structure with each of the segments converging loosely at the top of the inverted funnel. In application, the transmission shifter lever penetrates the smaller, upper hole thus formed, and in spite of being moved in horizontal arcs, maintains contact with the overlapping screen segments. Since there are a variety of boot geometries (circular based, oval based, and rectangular based) the flame attenuator base frame is provided in multiple shapes to accommodate the different boot configurations. The attenuator is located inside the shifter boot, and is manufactured either integrally to the boot, or as an add-on item. The flame attenuator protects the boot from rapid burn-through in the event of an engine fire.

An advantage of the present invention is that it provides a great deal of added safety to the occupants of a vehicle.

Another advantage of the present invention is that it provides a means to maintain the integrity of a firewall in a vehicle, without sacrificing shifter mobility.

A still further advantage of the present invention is that it is simple and inexpensive to manufacture, and it can be built as either original or add-on equipment.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
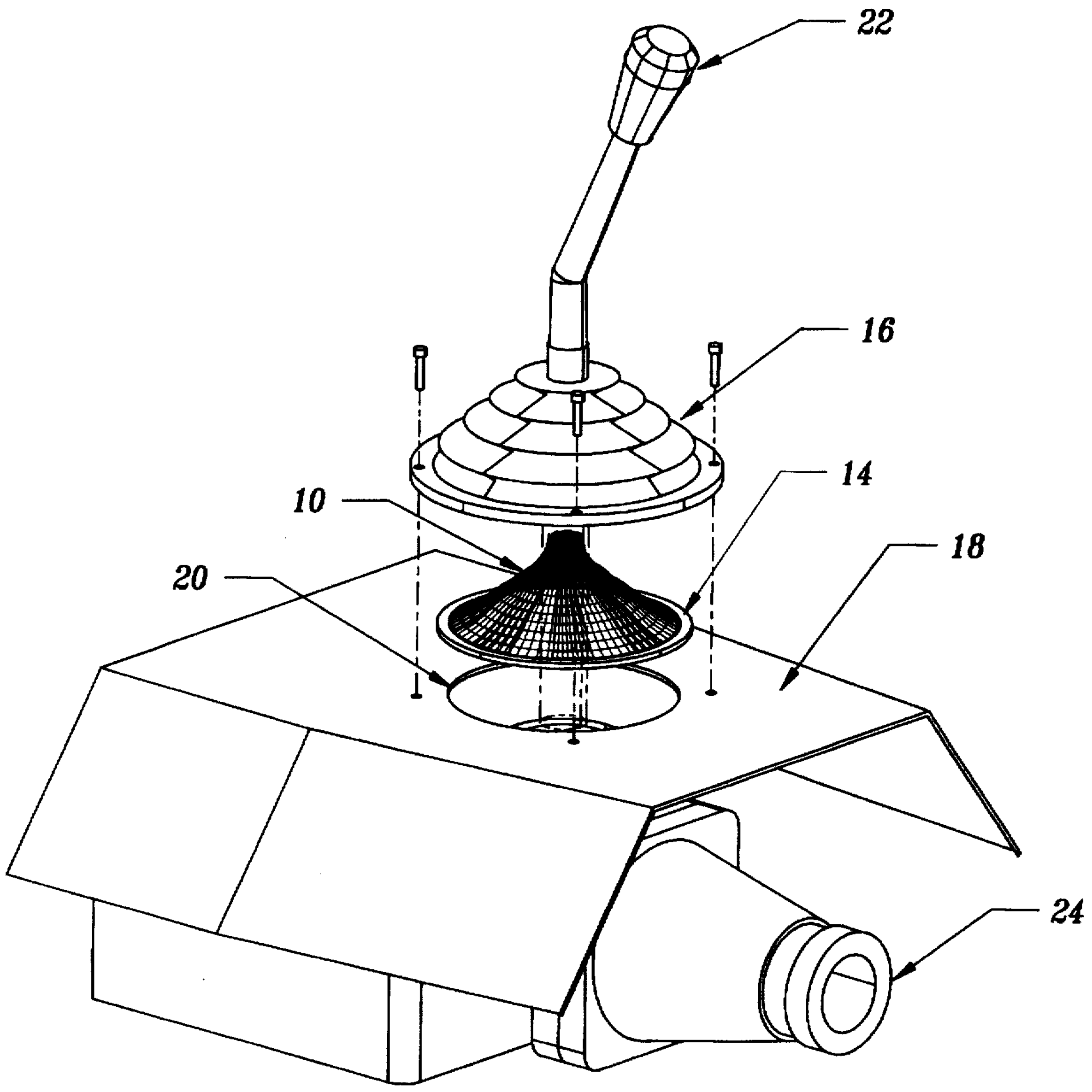
FIG. 1 is an exploded view of the flame attenuator of the present invention.
Figure 2:
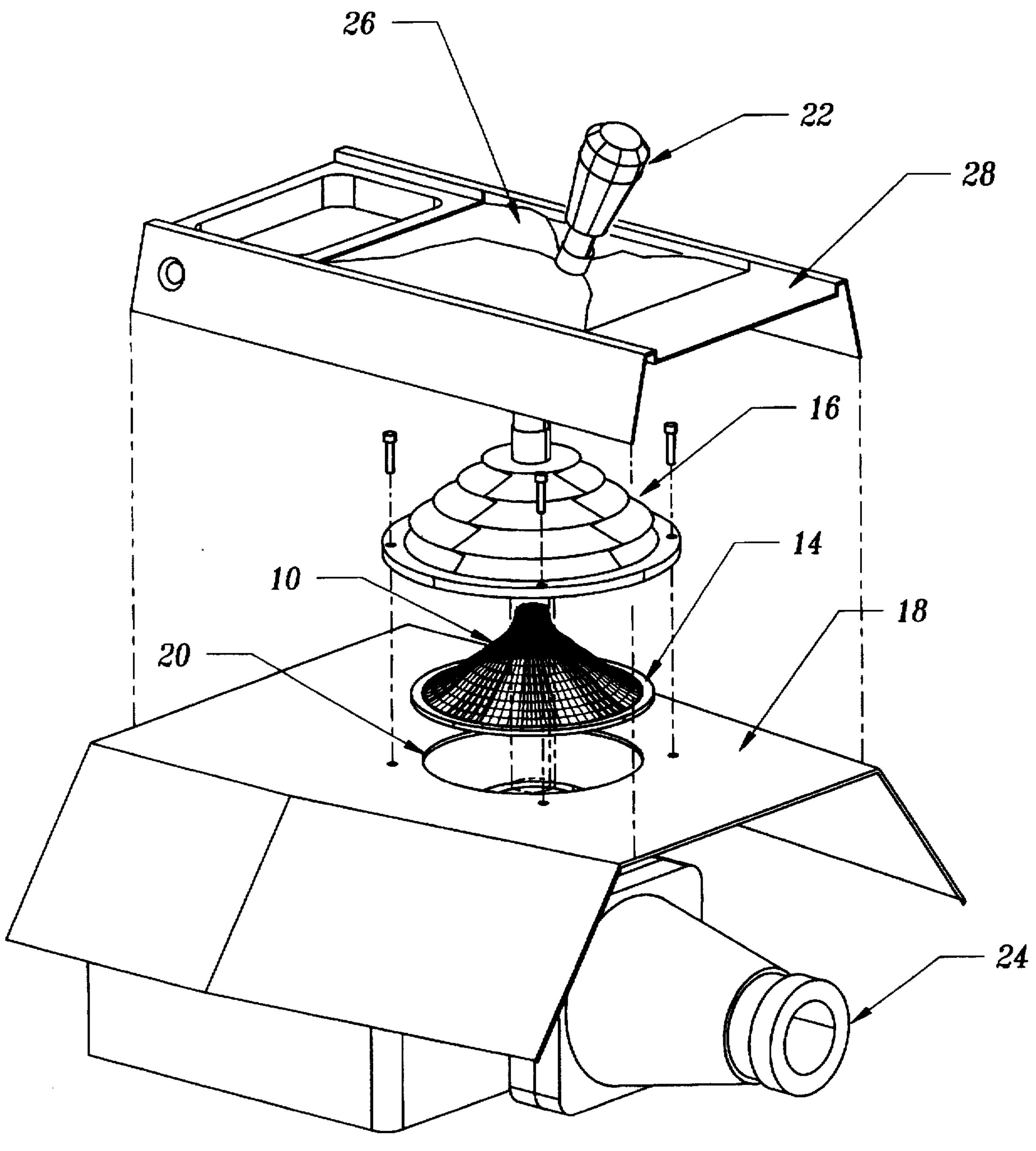
FIG. 2 is an exploded view of the flame attenuator adapted for a different shifter lever geometry.

Referring first to FIGS. 1 and 2, the present invention is a flame attenuator 10. The attenuator 10 comprises a plurality of overlapping segments 12. The segments 12 are affixed to a base frame 14. The segments 12 are affixed to the base 14 so that they form an inverted funnel-shaped structure extending above the base 14. Each segment 12 overlaps slightly the adjacent segments.

The attenuator 10 is placed inside a rubber dust boot 16 of a vehicle. The boot 16 with the attenuator 10 inside it is affixed to a floor 18 of the subject vehicle. The attenuator 10 is positioned so as to cover a gear shift lever opening 20 that allows a gear shift lever 22 to communicate with a transmission 24.

The gear shift lever 22 is usually covered by a decorative top cover 26 made of plastic or cloth. The cover 26 may be tied to the gear shift lever 22. Additionally, depending upon the model of vehicle, the shift lever 22 and the boot 16 may be contained in a console box 28.

Figure 3:
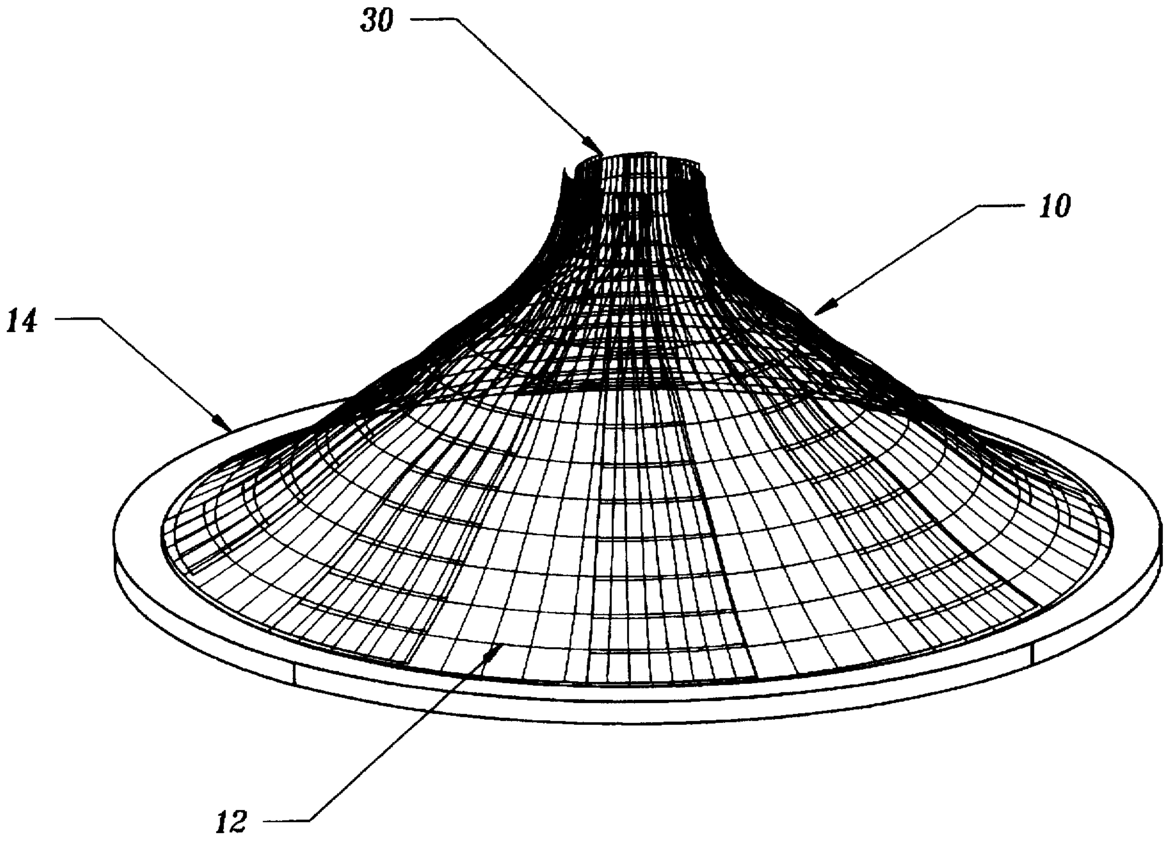
FIG. 3 is a perspective view of the flame attenuator.

Referring now to FIG. 3, the attenuator 10 comprises a plurality of segments 12. the segments 12 are shaped and joined so as to form an inverted funnel structure. The segments 12 are generally affixed to a base frame 14, but they may also be slidably attached to each other. The segments 12 are essentially trapezoidal in shape, but are non-planar. The segments 12 are bowed so that they form an inverted funnel shape. An opening 30 at the top of the attenuator 10 receives the gear shift lever 22. The segments 12 are positioned so that the opening 30 fits snugly around the gear shift lever 22.

Because the attenuator 10 is formed from overlapping segments of flexible mesh, the attenuator 10 can accommodate the necessary movement of the gear shift lever 22. As the gear shift lever is moved, the slidable positioning of the segments 12 on the base 14 allows the opening 30 to move with the lever 22, thereby maintaining the contact of the opening 30 with the gear shift lever 22. The result is that the opening 30 is not significantly enlarged, even as the gear shift lever 22 is moved about.

As is illustrated in FIGS. 1 and 2, there are a variety of boot geometries: circular based, oval based, and rectangular based. The flame attenuator 10 is made in a variety of shapes to accommodate the different boot configurations.

While the preferred embodiment of the attenuator 10 utilizes essentially trapezoidal segments, it is clear that the only requirements for the attenuator 10 to function properly is that the segments 12 mesh with overlapping portions and with gaps no larger than the mesh size of the screen material being used. Additionally, the top opening 30 must be able to move with the shifting lever 22 without impeding it's motion, and without opening large gaps in the attenuator 10. In addition to the trapezoidal configuration proposed, the segments 12 can also take the form of multiple corrugated conic segments, or overlapped spirals or hemispheres, as well as compact helices, or any other geometry that allows adequate overlapping.

EXAMPLE 1

Presuming a vehicle with a 4¼ inch diameter hole through the top of the portion of the floorboard forming the transmission hump, the attenuator 10 is constructed using a four inch diameter brass wire base frame 14 to which is brazed overlapping segments 12 made from 40 mesh metal screen material. The converging segments 12 easily encircle the shifting lever 22. The attenuator 10 has been found during experimentation, when inserted into the factory installed rubber boots 16 of the vehicle, to delay burn-through of a simple diesel fuel-flame, applied under the boot/screen assembly, for several minutes.

EXAMPLE 2

Again presuming a vehicle with a 4¼ inch diameter hole through the top of the portion of the floorboard forming the transmission hump, the attenuator 10 is constructed using a stainless steel wire material frame 14 with overlapping segments 12 made from forty mesh steel screen. This embodiment also delays burn-through for several minutes.

ALTERNATE EMBODIMENT

An alternative construction for the attenuator 110 is as a liner for the cover 26, or simply in place of the cover 26. In this embodiment, flexible ceramic fiber is the preferred material. When used in this manner, the attenuator 110 simply conforms to the desired shape of the cover, and is either affixed to the interior of the cover 26, or is simply installed in place of the cover 26.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

We claim:

1. A flame attenuator comprising:

a plurality of overlapping metal mesh segments, said segments are configured so as to form an inverted funnel-shaped structure, said funnel-shaped structure includes a substantially circular opening at a top end thereof;

each of said segments overlaps two adjacent segments, and said segments form an opening at a top end thereof to receive a gear shift lever; and wherein said attenuator is adapted to be placed inside a rubber dust boot of said gear shift lever.

2. The attenuator of claim I wherein:

said segments are affixed to a base frame.

3. The attenuator of claim I wherein:

said segments are essentially trapezoidal in shape, but are non-planar.

4. The attenuator of claim 2 wherein:

said segments are essentially trapezoidal in shape, but are non-planar.

5. A flame attenuator comprising:

a shroud formed from flexible ceramic fiber, and is configured in a shape so as to encircle a gear shift lever and to cover a hole in a vehicle floorboard, said hole receiving said gear shift lever.

6. The flame attenuator of claim 5 wherein:

said shroud is affixed in an interior of said cover of said gear shift lever.

* * * * *